United States Patent [19]
Dinallo et al.

[11] Patent Number: 5,929,857
[45] Date of Patent: Jul. 27, 1999

[54] METHOD AND APPARATUS FOR DYNAMICALLY CONSTRUCTING A GRAPHIC USER INTERFACE FROM A DVD DATA STREAM

[75] Inventors: Chris A. Dinallo, Boca Raton; Amir M. Mobini, Delray Beach, both of Fla.

[73] Assignee: Oak Technology, Inc., Sunnyvale, Calif.

[21] Appl. No.: 08/926,883

[22] Filed: Sep. 10, 1997

[51] Int. Cl.⁶ .............................. G06F 3/14; G06F 3/00
[52] U.S. Cl. ........................ 345/354; 345/352; 345/353
[58] Field of Search .................................. 345/352, 326, 345/333, 334, 970, 353, 354; 707/102, 104, 501

[56] References Cited

U.S. PATENT DOCUMENTS

| | | | |
|---|---|---|---|
| 5,493,677 | 2/1996 | Balogh et al. | 395/600 |
| 5,517,605 | 5/1996 | Wolf | 707/104 |
| 5,524,202 | 6/1996 | Yokohama | 707/104 |
| 5,611,035 | 3/1997 | Hall | 707/102 |
| 5,655,117 | 8/1997 | Goldberg et al. | 707/102 |
| 5,679,046 | 10/1997 | Cahill et al. | 395/616 |
| 5,682,511 | 10/1997 | Sposato et al. | 395/353 |
| 5,692,205 | 11/1997 | Berry et al. | 395/788 |
| 5,713,021 | 1/1998 | Kondo et al. | 395/614 |
| 5,729,730 | 3/1998 | Wlaschin et al. | 395/603 |
| 5,748,499 | 5/1998 | Trueblood | 364/551.01 |
| 5,754,841 | 5/1998 | Carino, Jr. | 395/603 |
| 5,870,523 | 2/1999 | Kikuchi et al. | 386/95 |

*Primary Examiner*—Mark K. Zimmerman
*Assistant Examiner*—David E. Brown
*Attorney, Agent, or Firm*—Kudirka & Jobse, LLP

[57] ABSTRACT

A DVD system includes a graphic user interface which is constructed during information playback from commands and attributes extracted from the DVD data stream. The extracted commands are presented to an intelligent DVD browser engine which gathers information about the shape and location of a user menu from the navigation data in the DVD data stream and other sources. The browser engine operates with a database containing sets of predefined images which depict controls, buttons and other graphic images that form part of the user menu. The browser engine uses the command information to construct a query in the database. The query is applied to the database to extract a set of images which form the complete user menu. The extracted images are then used to display the menu on a visual display along with the multimedia information. The images are updated as new commands and attributes are received.

21 Claims, 9 Drawing Sheets

| ATTRIBUTES | | VALUES |
|---|---|---|
| BUTTONS | | |
| | BUTTON ATTRIBUTES | |
| | POSITION (X,Y) | X: 0 - 479, Y: 0 - 719 |
| | HIGHLIGHT COLOR (SELECTED, ACTIVE, DESELECTED) | 0 - 255 FOR ALL |
| | CONTRAST (SELECTED, ACTIVE, DESELECTED) | 0% - 100% FOR ALL |
| | MOVEMENT (IF MORE THAN ONE MENU) | LEFT, DOWN, RIGHT, UP |
| | DISPLAY ROLL-OFF DIRECTION | ON OR OFF |
| | AUTOROLL | |
| USER OPERATIONS | | |
| | UOP0 | ON OR OFF |
| | ... | |
| | UOP24 | ON OR OFF |

| ATTRIBUTES | VALUES |
|---|---|
| BUTTONS | |
| BUTTON 1 ATTRIBUTES | |
| POSITION (X,Y) | 100, 100 |
| HIGHLIGHT COLOR (SELECTED, ACTIVE, DESELECTED) | 4, 6, 0 |
| CONTRAST (SELECTED, ACTIVE, DESELECTED) | 50%, 50%, 0% |
| BUTTON 2 ATTRIBUTES | |
| POSITION (X,Y) | 200, 100 |
| HIGHLIGHT COLOR (SELECTED, ACTIVE, DESELECTED) | 4, 6, 0 |
| CONTRAST (SELECTED, ACTIVE, DESELECTED) | 50%, 50%, 0% |
| BUTTON 3 ATTRIBUTES | |
| POSITION (X,Y) | 300, 100 |
| HIGHLIGHT COLOR (SELECTED, ACTIVE, DESELECTED) | 4, 6, 0 |
| CONTRAST (SELECTED, ACTIVE, DESELECTED) | 50%, 50%, 0% |
| MOVEMENT (IF MORE THAN ONE MENU) | |
| DISPLAY ROLL-OFF DIRECTION | RIGHT |
| AUTOROLL | OFF |
| USER OPERATIONS | |
| UOP0 | ON |
| . | |
| UOP7 | ON |
| UOP8 | OFF |
| UOP9 | OFF |
| UOP10 | ON |
| | |
| UOP24 | ON |

METHOD AND APPARATUS FOR DYNAMICALLY CONSTRUCTING A GRAPHIC USER INTERFACE FROM A DVD DATA STREAM

FIELD OF THE INVENTION

This invention relates generally to improvements in computer systems and, more particularly, to a system for generating a user interface display in a digital versatile disc system.

BACKGROUND OF THE INVENTION

Digital versatile discs (DVDs) are information storage devices used for storing prerecorded audio information, movies and computer software. The storage and playback mechanism used in DVDs closely resembles the mechanism used in compact discs (CDS), DVD players and software use the same laser technology as CD players. Briefly, both DVDs and CDS store information as a pattern of pits formed in a metallic substrate. The pit patterns form digital words and can be read by shining a laser beam on the disc surface and detecting the reflected beam. However, the information storage capacity of a typical DVD is much higher than a CD. Presently available DVDs have a variety of capacities which depend on the technology used to manufacture the discs. Single-layer technologies can be either single or double-sided with capacities of 4.7 gigabytes and 9.4 gigabytes, respectively. Dual layer technologies are available which use single or double sided capacities that hold approximately 8.5 gigabytes per side. This high information storage capacity makes DVDs suitable for storing not only audio information, but also video information and large amounts of computer data as well.

DVD players have many CD player features, such as the ability to play selections in any order desired and the ability to read information from any point on the disc. However, DVDs can store information in several formats. For example, DVDs which are used to store video information (hereinafter called DVD-VIDEO discs) may use various known information compression algorithms, such as MPEG-2 for video compression/decompression. A DVD may also include high fidelity sound as well. In addition, a DVD may also store uncompressed linear pulse code modulated data streams which have sample rates between 48–90 kHertz and are sampled at 16 or 24 bits. Still other DVD versions (hereinafter called DVD-ROM discs) can store digital data for computer use, and the data may also be compressed on these discs.

Although DVD-ROM and DVD-VIDEO discs share compression algorithms, the data format on DVD-VIDEO discs is significantly different than the data format found on DVD-ROM discs. One important difference is that the data content on DVD-ROM is platform-specific, while DVD-VIDEO discs operate with a platform independent navigation engine for playing interactive movies. This navigation engine requires that the files on the DVD_VIDEO disc be referenced in predetermined directory structure.

In particular, each DVD-VIDEO disc contains a main directory denoted as a VIDEO_TS directory which contains two types of files distinguished with the file extensions .IFO and .VOB. During playback, these files are sorted by a DVD video player to form video "title" sets, which are groupings of all files necessary to play a particular DVD video "title", for example, a movie. Each video title set is composed of one .IFO file and one or more .VOB files.

A file with the .VOB extension contains the actual multimedia data and is called a video object set. The location and format of the multimedia data stored in the video object set is defined by the associated .IFO file. In particular, .IFO files contain navigational data structures and a processor-independent interpreted language which specifies how the data structures are arranged.

The data structures themselves are composed of various objects called "program chain objects", "program objects", and "cell objects". Program chain objects link related program objects (or particular scenes) within a title and their data structures govern the playback of the program objects. For example, a simple title may contain only one program chain. However, complex titles may contain two or more program chains to allow random access to a variety of programs. The multiple program chain title can play programs linearly, randomly or in a "shuffle" mode. Program chains allow a particular program sequence to be changed during playback. Thus, it is possible to change the program contact based on stored information. This type of operation is used in implementing "parental control" levels in which information content which parents might find inappropriate (such as extremely violent or sexual material) can be removed from a playback and other material substituted without requiring several separate and complete programs.

Each program object in a program chain is composed of elements called "cell objects". These objects instruct a DVD player which portion of the multimedia data in one of the .VOB files to decode. In particular, the data structures in a cell object are defined in the .IFO file and the multimedia content is found in one of the .VOB files. Each cell object directs the DVD player to begin playback at a specific location in the .VOB file which is referred to as a video object unit or "VOBU". A VOBU is a container object that includes both multimedia data and playback program commands. More specifically, each VOBU may contain a header or navigation pack called an "NV_PACK" that, in turn, contains navigational commands, user operation data and "highlight" commands which control the presentation of the information on the display.

The specific program commands which are recognized by a DVD player are controlled by a device independent language and a set of DVD player parameters which define the current state of the DVD player. These commands cause the DVD player to perform a number of operations, such as generating menu controls at specific locations on the display screen. In order to process these commands a DVD player system typically includes a processor and associated memory (which may be part of the player or a separate computer) and display device. Preferably, the player system is controlled by a playback program running under an operating system such as WINDOWS NT® or OS/2®.

Input can also be obtained directly from a user by means of displayed controls, such as buttons, which can be displayed under playback program control on screen along with the multimedia data in an arrangement called a graphic user interface. The playback program controls both the time duration that a control appears on the screen and the manner that the system responds to the selection of a control by a user. For example, user selection of a button may cause the playback program to jump to a new location on the disk and begin playback at the new location. The playback program may also display menus which guide a user through various tasks.

However, in prior art systems the graphic user interface was fixed and therefore had the same appearance no matter what multimedia data was being displayed. In some cases, the menu selection and controls were inappropriate for the information content actually displayed. Further, user interfaces tended to be generic because they had to service many different types of data. Accordingly, in other cases, selective controls which would have made the system much easier to use were simply not available on the generic interfaces.

Other prior art systems generated a graphic user interface including controls generated on the navigation commands in the DVD data stream, but these devices merely displayed controls at locations specified by the navigation data and were thus limited in the construction of screen displays to the sparse data in the DVD data stream.

Accordingly, it would be desirable to have a DVD system that ensures appropriate user interfaces which are customized based upon the DVD information content to allow efficient and easily understandable manipulation of the DVD player and data.

It would be further desirable to construct a graphic user interface based not only on navigational data, but also other information to create a dynamic display.

SUMMARY OF THE INVENTION

In accordance with one aspect of the invention, a DVD system includes a graphic user interface which is constructed during information playback from commands and attributes extracted from the DVD data stream. In particular, the extracted commands are presented to an intelligent DVD browser engine which gathers information about the shape and location of a user menu from the navigation data in the DVD data stream. The browser engine operates with a database containing sets of predefined images which depict controls, buttons and other graphic images that form part of the user menu.

Specifically, the browser engine uses the command information to construct a query in the database. The query is applied to the database to extract a set of images which form the complete user menu. The extracted images are then used to display the menu on a visual display along with the multimedia information. The images are updated as new commands and attributes are received.

In accordance with one embodiment, a default interface display is presented on the display screen when no navigational information is present. The default display may also be presented along with customized menu information in response to navigation commands.

BRIEF DESCRIPTION OF THE DRAWINGS

The above and other features, objects and advantages of the invention will be better understood by referring to the following detailed description in conjunction with the accompanying drawing in which.

DETAILED DESCRIPTION OF THE PREFERRED EMBODIMENT

Figure 1:
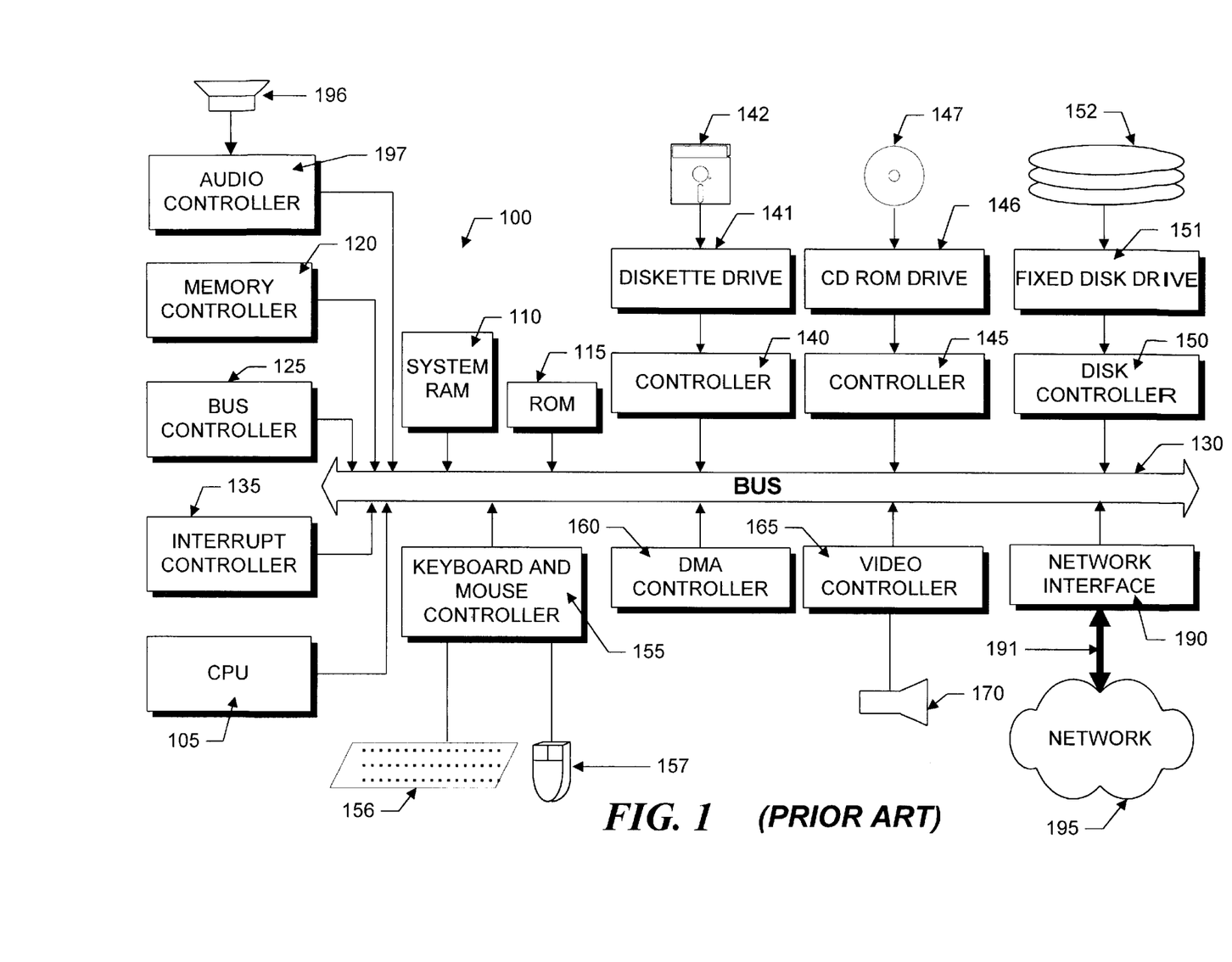
FIG. 1 is a block diagram of a computer system suitable for use with the present invention.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as in an IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RMA 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Operation of computer system 100 is generally controlled and coordinated by operating system software, such as the OS/2® operating system, available from International Business Machines Corporation, Boca Raton, Fla. The operating system controls allocation of system resources and performs tasks such as processing scheduling, memory management, networking, and I/O services, among other things. In particular, an operating system resident in system memory and running on CPU 105 coordinates the operation of the other elements of computer system 100. The present invention may be implemented with any number of commercially available operating systems including OS/2, UNIX and DOS, etc. One or more applications such as Lotus Notes, commercially available from Lotus Development Corp., Cambridge, Mass. If operating system is a true multitasking operating system, such as OS/2, multiple applications may execute simultaneously.

Figure 2:
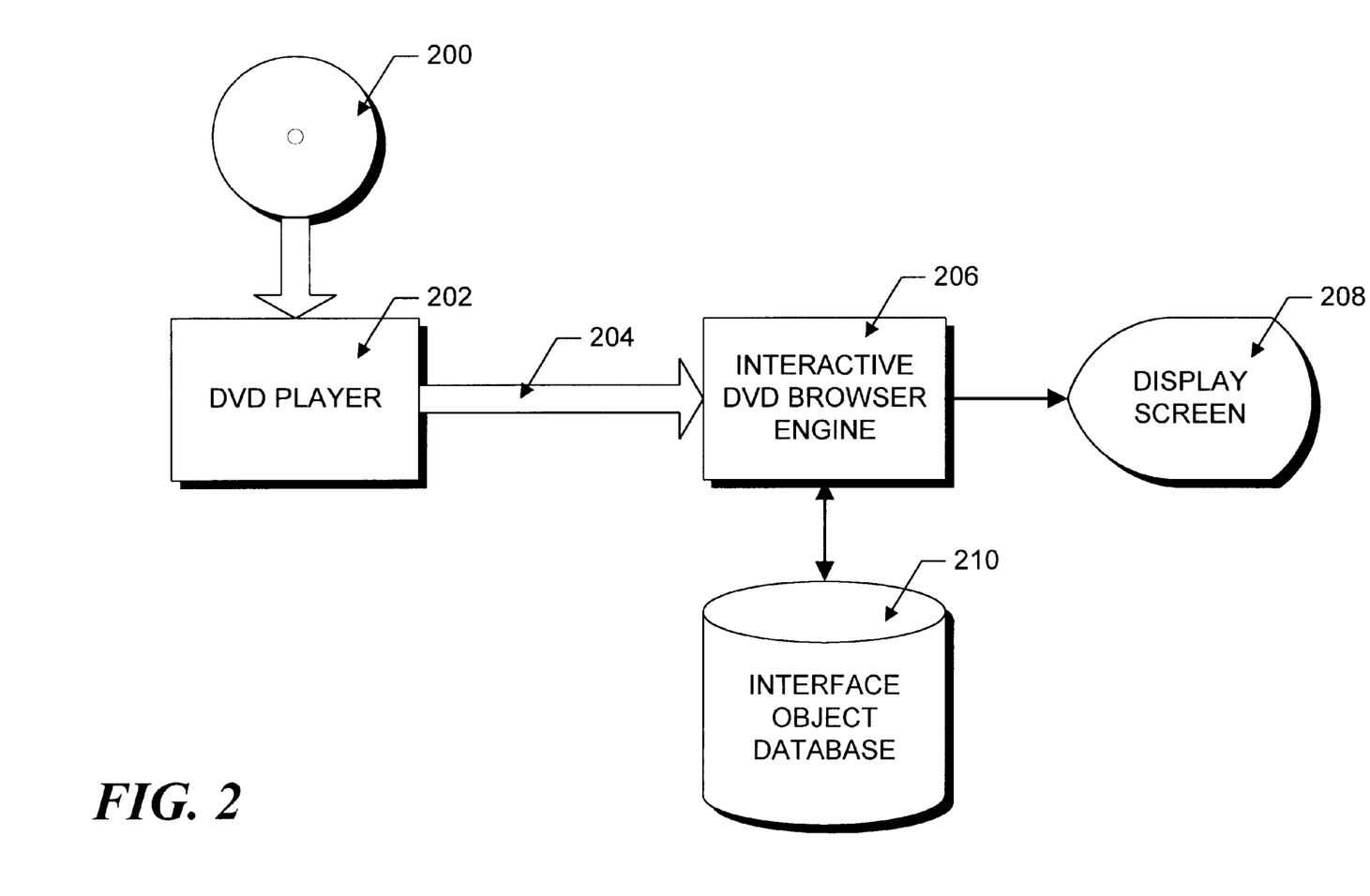
FIG. 2 is a conceptual block diagram which illustrates the interaction between the DVD, data stream, the interactive DVD browser engine, the image database and the display.

FIG. 2 illustrates conceptually the user interface system in accordance with the present invention. In a preferred embodiment, the elements of interface system are implemented in the C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise objects are destroyed by a special function called a destructor. Objects may be used by using their data and invoking their functions. When an object is created at runtime memory is allotted and data structures are created.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the attributes and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, at runtime, the program will determine which of the three functions is actually called by examining the variable types. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Object-oriented technology forms the basis for component technology. For the purpose of this disclosure, components are essentially C++ objects that conform an object model, such as Microsoft's Component Object Module. An object module is a unifying set of rules that describe object structure, object life cycle, and inter-object communication. Object structure relates to the physical layout of objects in memory, while object life cycle refers to how applications create and destroy objects. Inter-object communication refers to protocols by which objects communicate with one another. Object modules are useful in contexts where all objects in a given system need to conform to a given protocol governing these parameters. Most object-oriented and object-based languages, including C++, do not specify true object modules, but merely specify syntax and semantics of a basic object implementation without specifying the rules that unify object systems.

FIG. 2 illustrates, in a high level block diagram, the processing of a DVD data stream by an interactive DVD browser engine to dynamically construct a graphical user interface (GUI), or a menu system, from images retrieved from a database. More specifically, DVD disk 200 is inserted into a conventional DVD player 202. DVD disk 200 contains thereon multimedia data which may be interleaved with command data and attributes. Information on DVD disk 200 is detected and processed by DVD player 202 in an conventional manner using the aforementioned laser readout arrangement to generate an electronic data stream 204.

The resulting DVD data stream 204 is provided to the interactive DVD browser engine 206 constructed in accordance with the principles of the present invention. The browser engine 206 contains a parser, which examines the data stream 204 to extract the navigation commands and attributes. The DVD browser engine 206 uses the commands and attributes to construct a database query that defines a user menu. A user menu for example, may consist of a plurality of buttons or other controls which may be either highlighted, selected or deselected, and located in various positions on the video display screen. It is important to note that this query can be constructed not only from information retrieved from the DVD data stream, but also from additional information. For example, information entered by the user can be used to construct the query along with the navigational data. Other information might include the position in the multimedia data stream at which the query is made or the information content.

Once constructed, the query is used to search the interface object database 210. The interface object database includes prestored image information which has been programmed into the browser. For example, the database may contain a plurality of images corresponding to various controls in selected, active and deselected states and located at various positions on the display screen. These images can be a plurality of bitmap images or other images. A set of these images is returned to the browser engine in response to the query. This image set is then used to construct the GUI display.

In a preferred embodiment, the interface object database is a relational database and the query is a relational database query. The database may also illustratively be an object-oriented database. The construction and operation of object-oriented databases are well-known. If an object-oriented database is used, the query would be generated by constructing a search object, called a menu type object, from the data stream command and attribute information and matching the type object in the database. When a relational database query is based on a menu type object, the results returned are a plurality of bitmap unit objects. Each of these bitmap unit objects contains image data and a drawing method for rendering a control image on the display screen. The graphic interface can then be constructed by iterating over all of the bitmap unit objects and calling each object's draw method.

Figure 3:
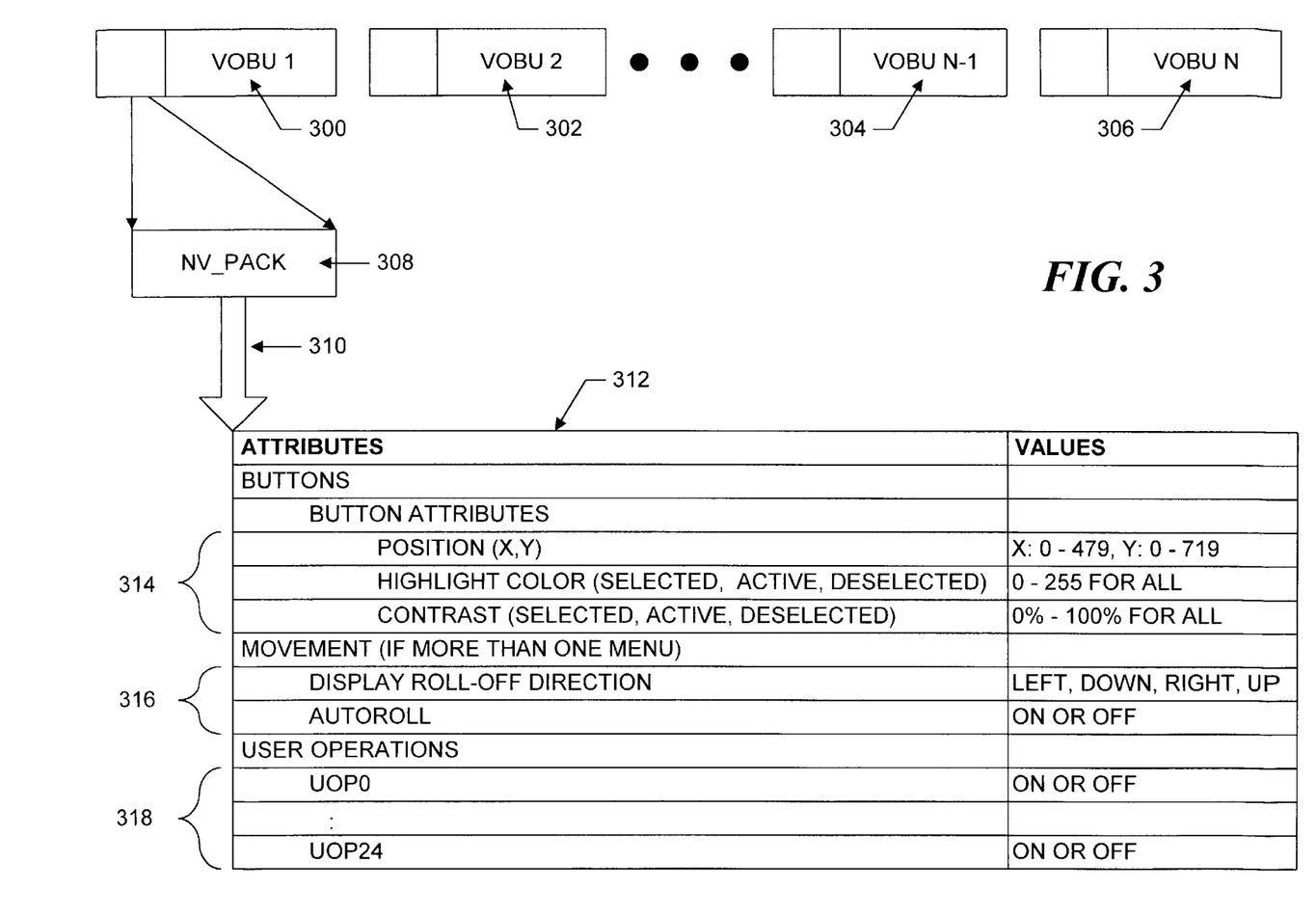
FIG. 3 is a conceptual diagram illustrating how navigational data is extracted from the DVD data stream and used to build a query using a menu type object.

The construction of a menu type search object is illustrated schematically in FIG. 3. The DVD data stream generated by DVD player 202 is illustrated schematically by a plurality of video object units, 300–306 shown across the top of the figure. These video object units are presented to a conventional parser, which examines the header of each video object unit, and specifically examines the navigation packs, of which pack 308 is illustrated. Each navigation pack includes navigation commands and may include menu construction commands, including menu control attributes. For example, navigation pack 308 may contain a command to display a button at particular X and Y coordinates and highlight the button. The command is to display a button and the attribute are the X and Y coordinates and the highlight.

These commands and attributes are extracted by the parser and, as indicated by arrow 310, used as parameters in the constructor of the menu type object. FIG. 3 represents, in a stylized diagram, class information 312 for a typical menu type object. A display button command would cause the button attributes to be used in the constructor for the menu type object.

Each menu type object includes a plurality of values for corresponding attributes. For example, the graphic user interface may have a plurality of buttons, each of which have three attributes. The attributes 314 for one button are illustrated in FIG. 3. The attributes consist of the X, Y position for upper left hand corner of the button. The X position is between values 0–479, whereas the Y position may run from 0 to 719. These values correspond to a button location in a display in which the origin is at the upper left (corresponding to X, Y values 0, 0) and the units are picture resolution units.

In addition, each button but may have a highlight color corresponding to each of a selected state, an active state, and a deselected state. A different color may be selected for each of these states. Each color is represented by a number in the range of 0–255 for each state. Similarly, the button color contrast may be selected for each three states corresponding to a selected state, an active state, and a deselected state. The contrast may range from 0 percent to 100 percent for each of these states. Each button specified in the menu type object will have the four attribute values of X and Y position, highlight color and contrast. The highlight color and contrast are dynamically adjusted in response to the selection or deselection of a control and the activation of a control.

Additional information can also be provided in the menu type object. This information 316 is used when there is more than one menu and is used to select bitmaps that indicate how the system moves from one menu to another. In particular, display roll-off direction indicates whether a subsequent menu is located to the right, left, above or below, a currently displayed menu. This attribute may be used to select appropriate indicia such as arrows or scroll bars.

An "autoroll" function may also be available. This function causes the menu to scroll off the screen if a cursor is moved to the edge of the display. This function can be activated or deactivated by specifying an "on" or "off" value for the attribute.

Further, various user operations may be either enabled or disabled by information in the menu. In the particular embodiment shown in the present invention, 25 user operations may be enabled or disabled, by placing an "on" or "off" value in the appropriate attribute in the menu type object. These operations may consist, for example, of the user controlled operations of play, stop, fast forward, rewind, pan/scan mode, step, etc. As will hereinafter be explained, the presence of these user operation attributes in the menu type object allows associated buttons, which normally control these operations, to be either enabled or disabled, thereby allowing the data stream to control the user interaction.

More specifically, in accordance with the principles of the invention, user operation buttons can be controlled by the logic of the DVD browser engine even though no navigation commands in the data stream explicitly turn on or off these functions. Since these operations are specified as part of the menu type object, when this object is applied to the object oriented interface object database, a set of bitmaps will be retrieved showing the appropriate controls as activated or deactivated. This set of bitmaps will be retrieved whether or not explicit navigation commands are present in the DVD data stream to request deselection or deactivation of the controls.

In accordance with a preferred embodiment, when the navigation content does not contain information to generate menus for user interaction, a generic menu is displayed which represents a fixed interface for user interaction during playback. An illustrative form of this interface is shown schematically in FIG. 4 and consists of a background bitmap 400, which resembles a hand held remote control similar to that used with a video cassette recorder. The user can interact this "remote control" by selecting various images by means of the keyboard, mouse or infrared device.

Figure 4:
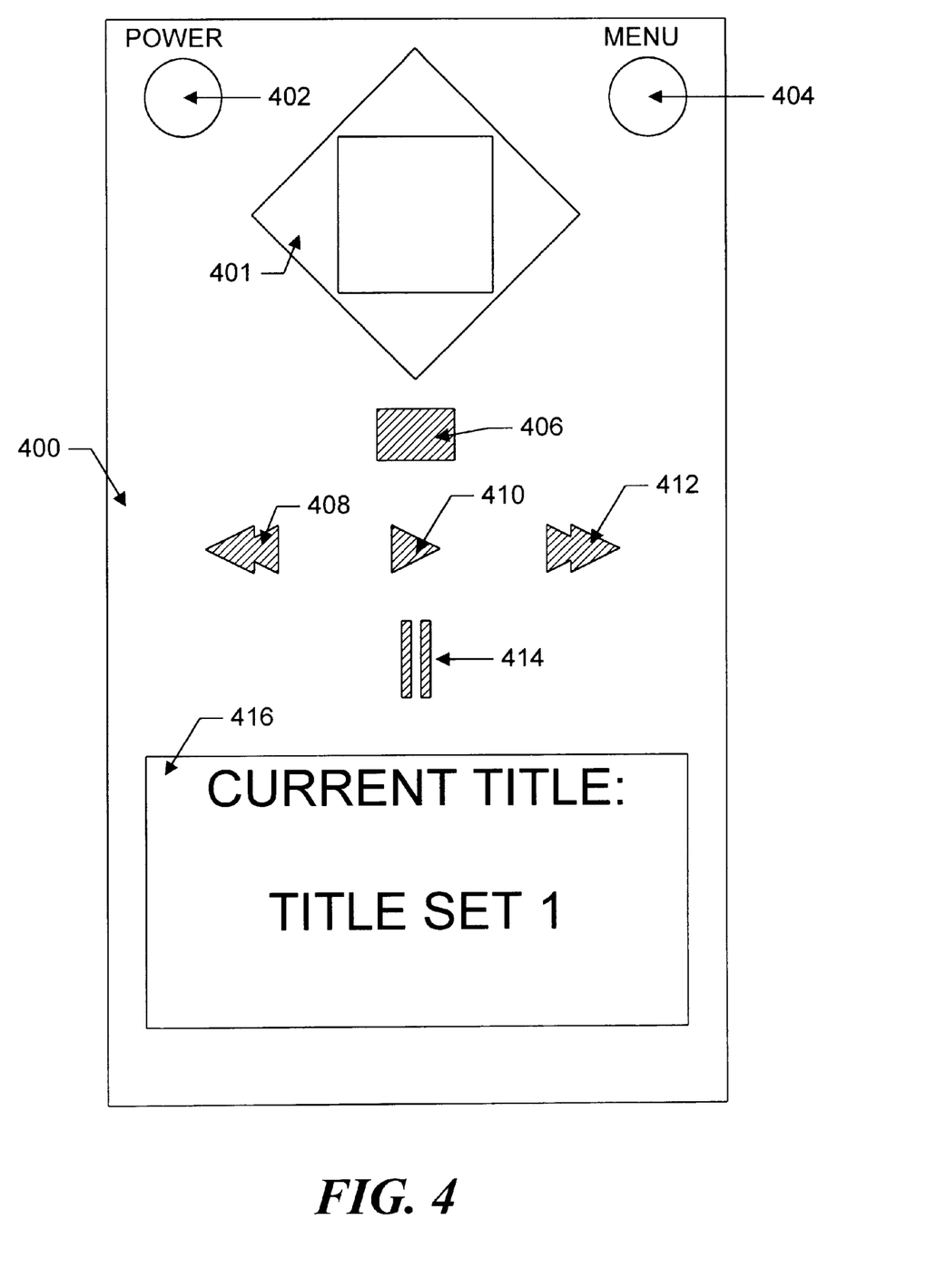
FIG. 4 is a stylized illustration of a screen display of a default menu display which is displayed when no navigational data is available.

The interface consists of a plurality of bitmap images which represent various functions. These images can illustratively include, a power "light" 402, and a menu "light" 404. The displayed bitmaps can also include direction indicator 401, stop button 406, rewind button 408, play button 410, fast forward button 412, and pause button 414. Each function on the interface may be represented by a unique bitmap. Upon selection and activation the color and contrast of the bitmap are changed dynamically to respectively represent selected and deselected button states. In addition, there can be a digital display bitmap 416, which can display related text to present information to the user such as the current playback state and title set number.

In a preferred embodiment, the default information will always be displayed as part of the graphic user interface. In this case, the selected and deselected states of the various controls 401–416, are controlled by the user operation attributes of a menu type object. For a default display in which a navigational information is present, the remainder of the menu type object would be blank.

However, in situations where additional navigational information is available to create a more customized display, a menu can be constructed in real time according to navigation commands retrieved from the DVD data stream. The style of a menu presented in accordance with these commands is determined from a database of bitmap images 210. The browser engine 206 determines not only which bitmap to present, but will also will determine where on the display screen each bitmap be displayed.

Figure 5:
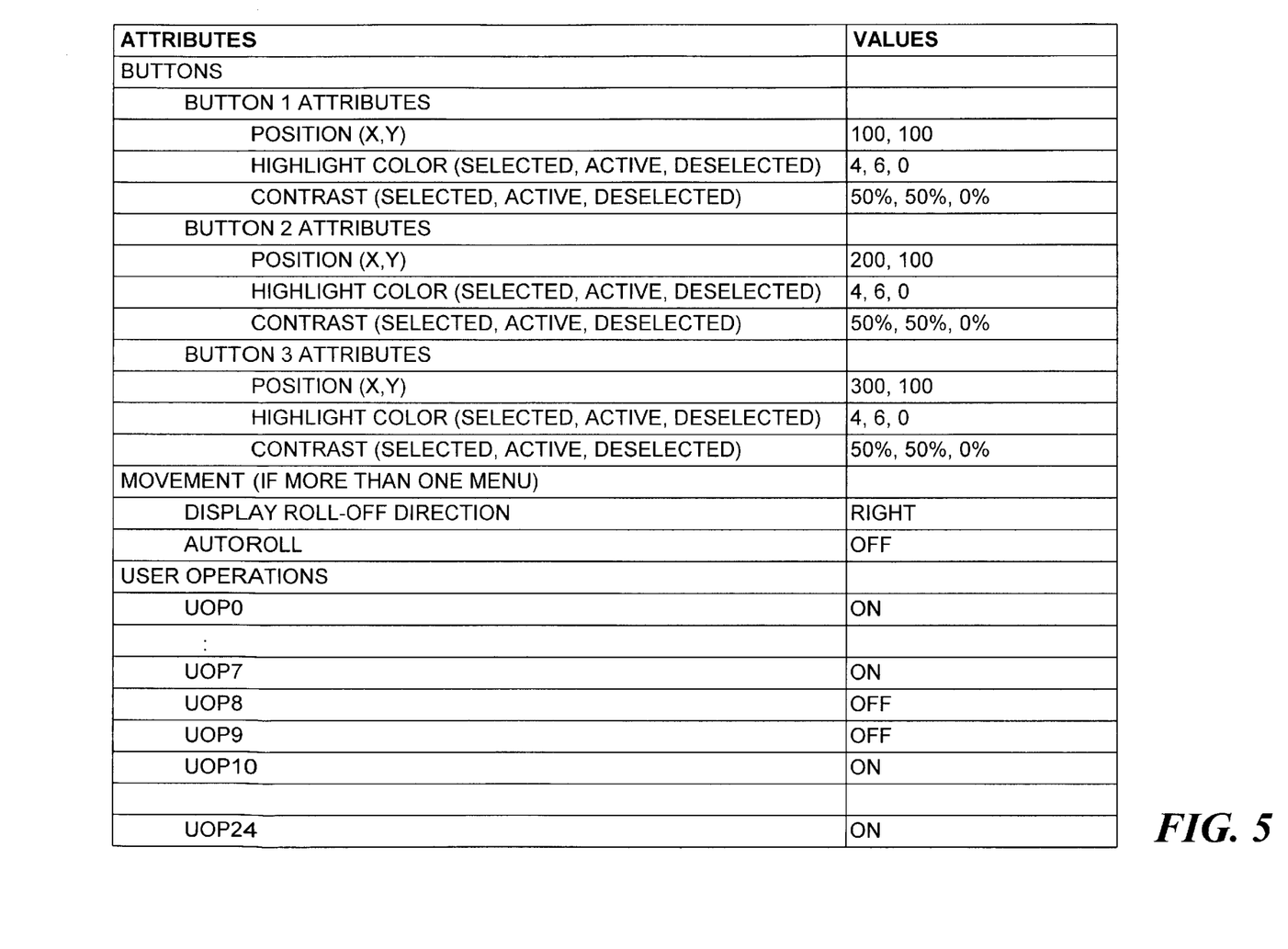
FIG. 5 is a schematic diagram indicating a completed sample menu type object.

FIG. 5 illustrates a menu type object, in which the attribute values have been ascertained from navigation data which specifies that three buttons are to be displayed on the multimedia display screen with one of the buttons highlighted. For example, button one is to be displayed at position 100, 100, where as button two is to be displayed at position 200, 100, and button three is to be displayed at position 300, 100. This positioning corresponds to a horizontal array of three buttons. Each button is assigned three colors to indicate the selected, active and deselected states. In the example shown in FIG. 5, the values 4, 6, 0 are assigned to the selected, active and deselected values. In addition the contrast of the three buttons is assigned contrast values of 50%, 50% and 0% for the selected, active and deselected states, respectively. This button information can be extracted directly from the navigation commands which request presentation of the buttons.

In addition, the display movement attributes indicate a display roll-off in the right direction with a disabled autoroll function. This information can be generated by either determining that there are two many buttons to be presented than will fit on one screen or by detecting the presence of a "more" button indicating that additional menu information is present.

User operations 0–7 and 10–24 are specified as "on" and user operations 8 and 9 are designated as "off". The user operation states can be generated by a predetermined algorithm which uses the system state to determine which functions should be enabled and which should be disabled. The system state will depend on content being presented, previous user inputs and other menu information, such as buttons, which are being presented.

Figure 6:
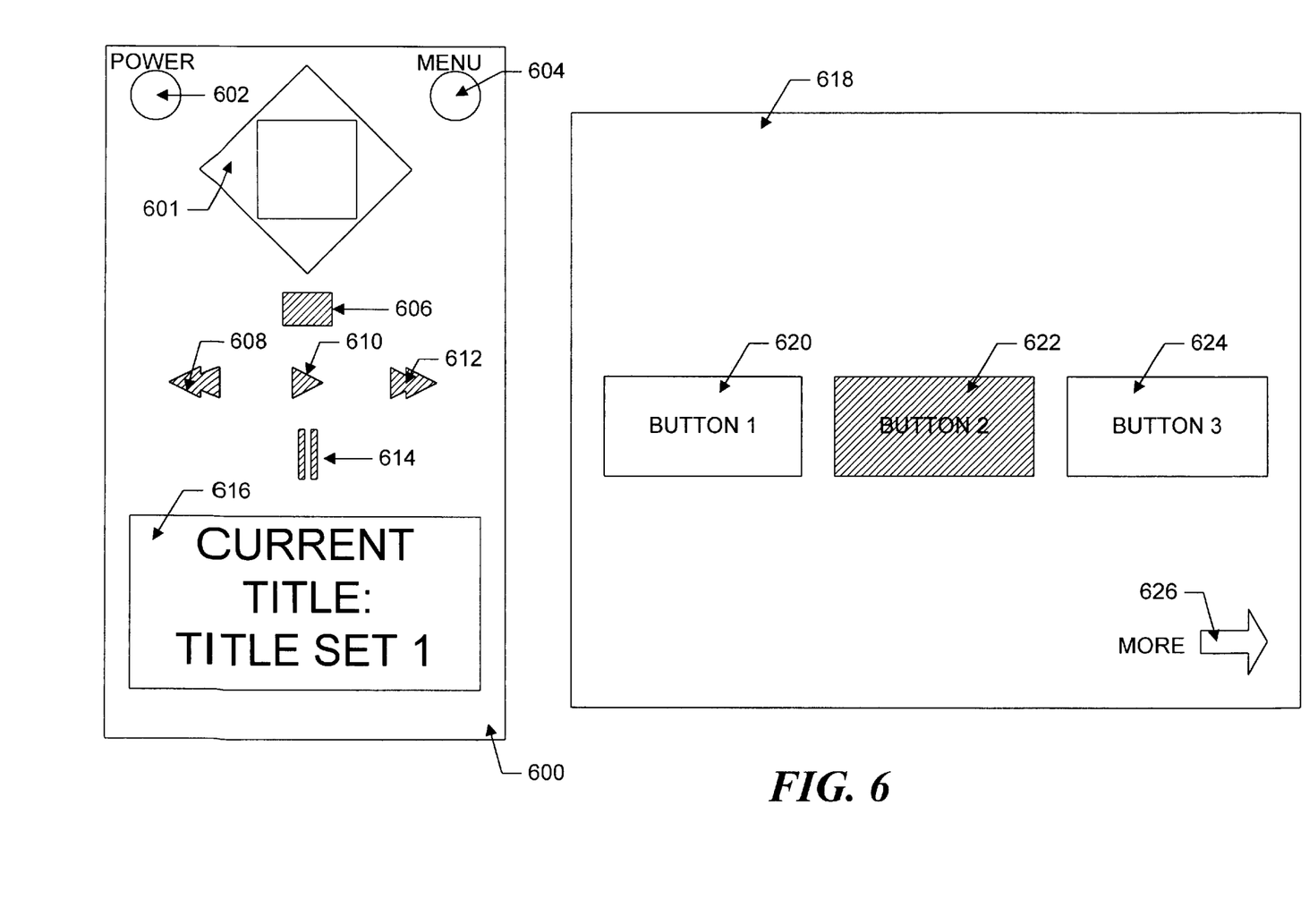
FIG. 6 is a stylized illustration of a screen display of a default menu display which is displayed along with a customized menu which is displayed in response to the navigational command information illustrated in FIG. 5 before a query is presented to the image database.

A display created by the raw navigation data, which was used to create the menu type object illustrated in FIG. 5, is illustrated in FIG. 6, which is a stylized view of a display screen. In particular, the default "remote control" display 600 is shown to the left of the multimedia data viewing area 618. The three buttons 620, 622, and 624 are shown drawn in the viewing area 618. Button 622 has been selected with a mouse or keyboard and is therefore illustrated in a different color. Also shown, is a "more" arrow 626 indicating that additional menu choices are available by selecting the arrow.

Figure 7:
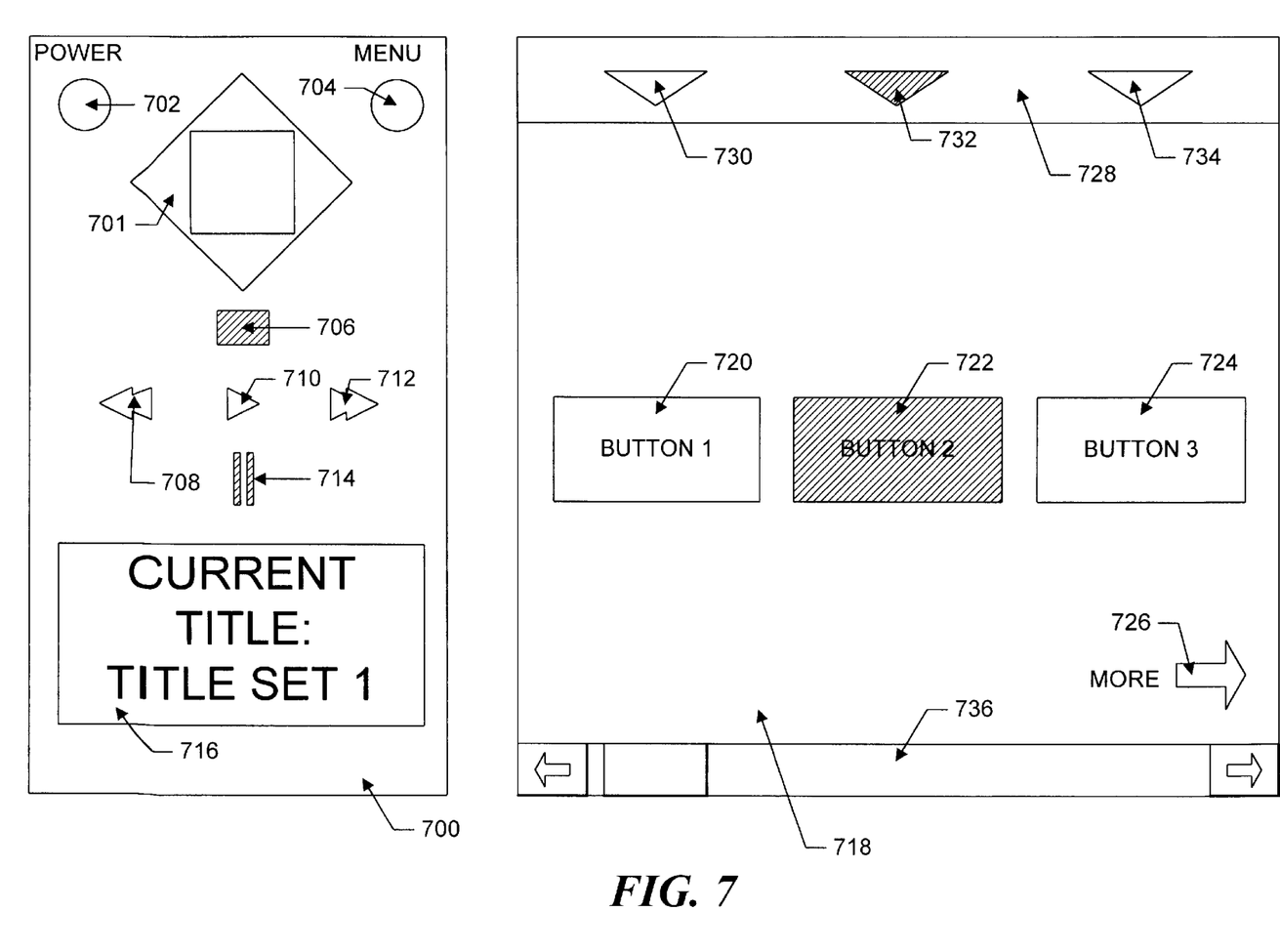
FIG. 7 is stylized illustration of a screen display of a default menu display which is displayed along with a customized menu which has been enhanced with additional images retrieved from the image database in response to the query presented by the menu type object illustrated in FIG. 5.

The display shown in FIG. 6 can be enhanced by using the principles of the invention. More particularly, the menu type object illustrated in FIG. 5 can be applied to the bitmap image database as a relational database query and used to retrieve a set of bitmaps unit objects that make up a predetermined menu style. Such an enhanced menu is illustrated in FIG. 7. It can be seen from FIG. 7, that some additional information is automatically provided by the interface object database. For example, a header 728 has been added, which includes three "down" arrows 730, 732, and 734 horizontally located above corresponding buttons 720, 722, and 724, respectively. The middle arrow 732 is highlighted to indicate that button 722 is active. Further, a scroll bar 736 has been added to allow the display to be scrolled to another portion of the menu.

In addition, the rewind, play, and fast forward buttons, 708, 710 and 712, on the default display have been disabled by controlling the color and contrast. This can be done whether or not there are specific commands in the navigation stream to disable these buttons. For example, the buttons can always be disabled when customized buttons, such as buttons 720, 722 and 724 are presented in the video display area 718. Other logic may be used to enable or disable the buttons at appropriate times depending on the user action.

Figure 8:
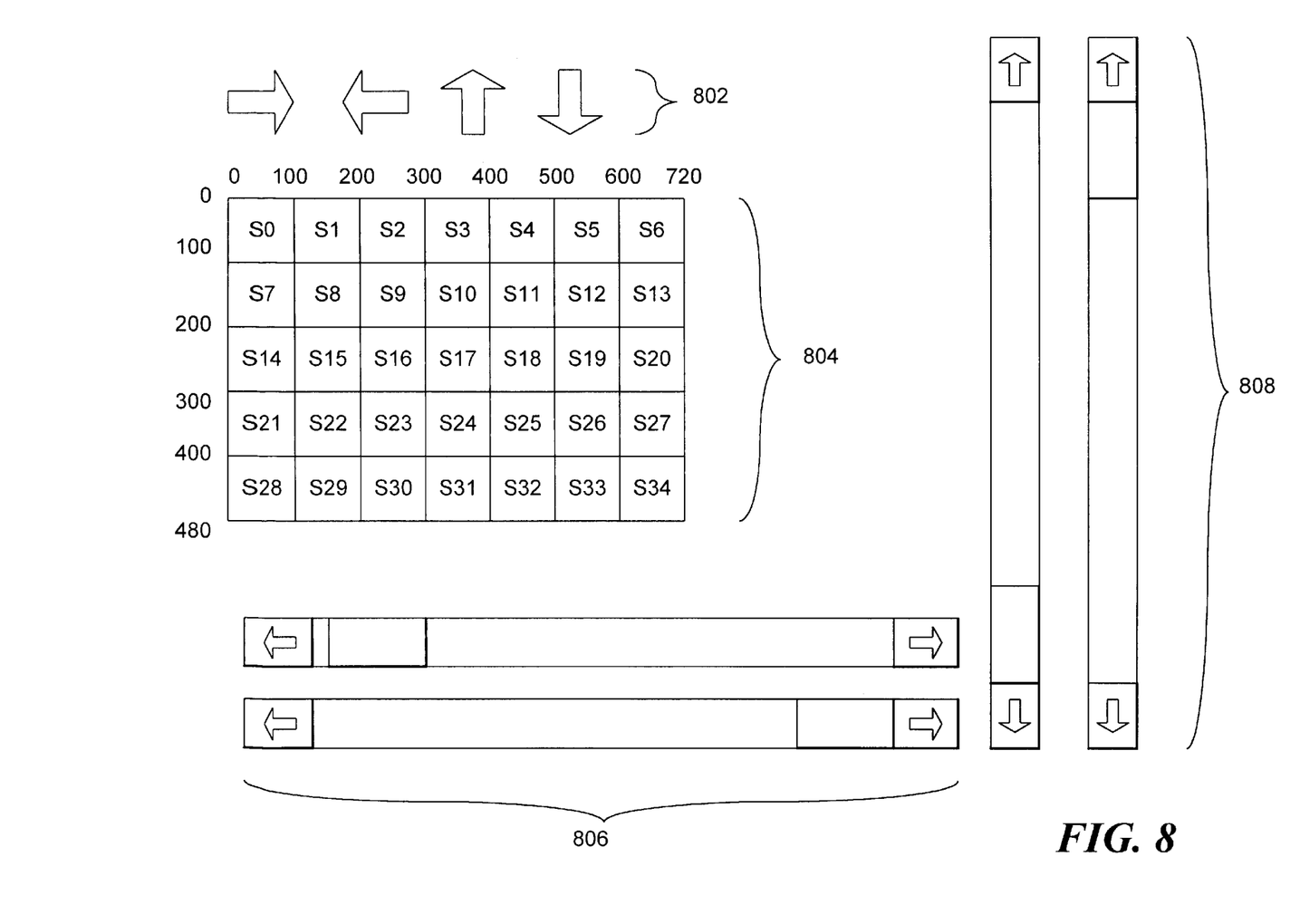
FIG. 8 is a schematic representation of the contents of a bitmap unit object database.

FIG. 8 schematically illustrates the contents of an interface object database. The illustrative database contains direction bitmaps 802 indicating right, left up, and down directions respectively. The database also contains sets of control bitmaps 804. These sets correspond to thirty-five different areas of the display screen (S0–S34.) The use of different bitmaps in different screen areas allows the size or shape of a control to change depending on whether it is displayed in the center of the display or along an edge. Also included are the scroll bars 806 and 808 for permitting scrolling of the menus from the display screen. Right, left, up and down scroll bars are included.

Figure 9:
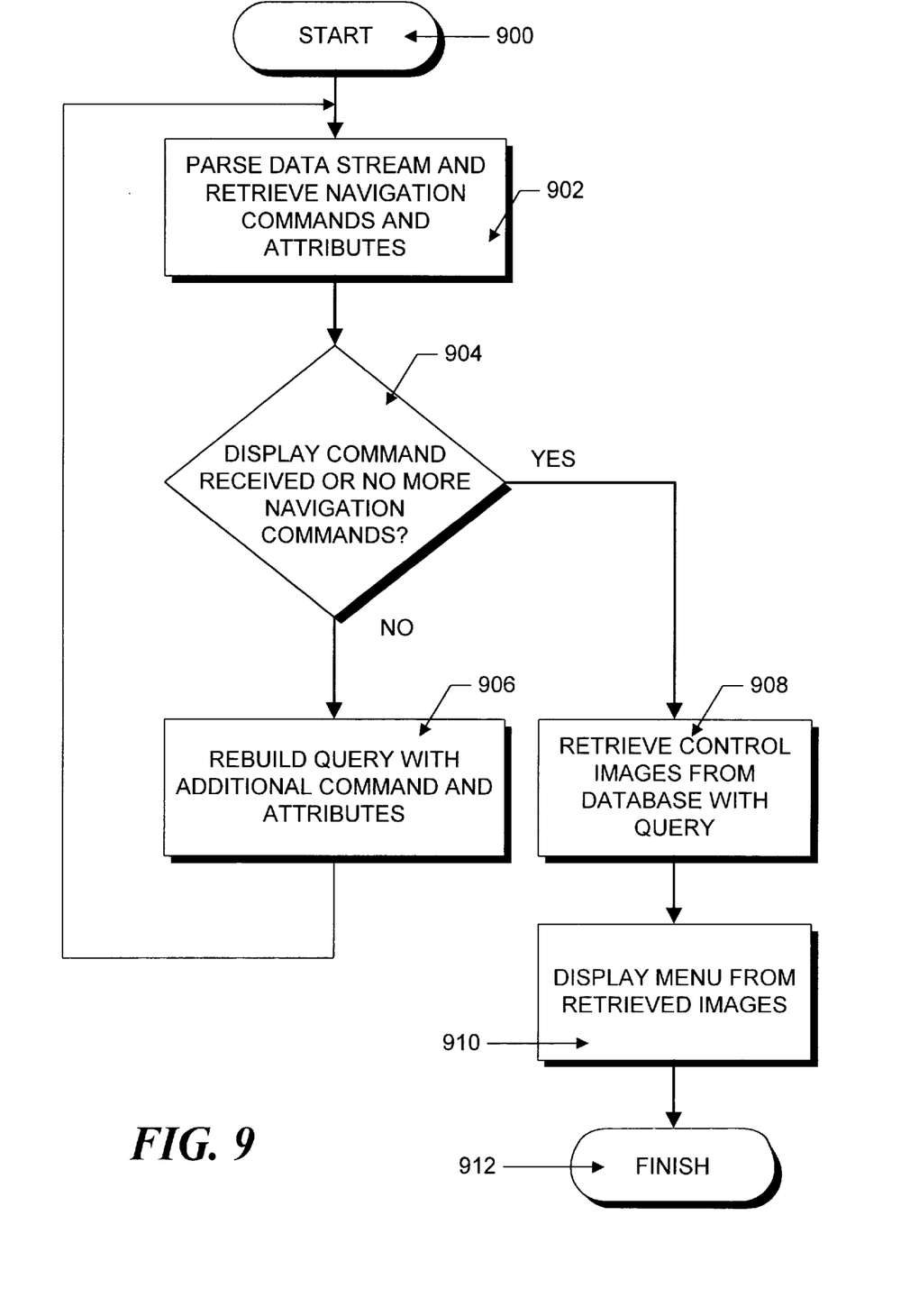
FIG. 9 is a flowchart illustrating the algorithmic steps involved in retrieving commands and attributes from the DVD data stream and constructing a customized menu therefrom.

FIG. 9 illustrates a routine used to construct the user interface display. The routine starts in step 900 and proceeds to step 902 in which the DVD data stream is parsed to extract the navigation commands and attributes. At step 904, a determination is made whether a menu display command has been received or whether no more navigation commands are being received. If the result of the determination is no, then the routine proceeds to step 906 in which the relational database query is rebuilt with the new information. In the case of the menu type object additional attributes may be added to the object. The routine then proceeds back to step 902.

Alternatively, if, in step 904, the result is yes, then the routine proceeds to step 908 in which the relational database query built from the navigation commands is used to search the image database to retrieve a set of images for the menu. In step 910, the retrieved images are used to display the menu and the routine ends in step 912.

A software implementation of the above described embodiment(s) may comprise a series of computer instructions either fixed on a tangible medium, such as a computer readable media, e.g. diskette 142, CD-ROM 147, ROM 115, or fixed disk 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Further, aspects such as the size of memory, number of bits utilized to represent datum or a signal, data word size, the number of clock cycles necessary to execute an instruction, and the specific configuration of logic and/or instructions utilized to achieve a particular function, as well as other modifications to the inventive concept are intended to be covered by the appended claims.

What is claimed is:

1. Apparatus for dynamically generating an interactive graphic user interface for enabling a user to control a DVD player to retrieve a multimedia data stream from a DVD and display the multimedia data on a display, the apparatus comprising:

a parser responsive to the multimedia data stream for extracting navigation commands therefrom;

a database of graphic images, each of which contains graphic data for a menu control image;

means responsive to the retrieved navigation commands for retrieving selected graphic images from the database, said images including depictions of user controls;

means for displaying the selected graphic images on the display screen to create a graphic display; and means, responsive to user activation of the user controls depictions, for controlling a DVD player to retrieve a multimedia data stream from a DVD and display the multimedia data on a display.

2. The apparatus as recited in claim 1 wherein the retrieving means comprises a database mechanism for building a query from the retrieved navigation commands.

3. The apparatus as recited in claim 2 wherein the database mechanism receives information from the user to build the query.

4. The apparatus as recited in claim 2 wherein the database mechanism rebuilds the query in response to each new retrieved navigation command.

5. The apparatus as recited in claim 4 wherein the retrieving means uses the rebuilt query to retrieve additional graphic images from the database and the displaying means displays the additional graphic images so that the display changes dynamically in response to the navigation commands.

6. A method for dynamically generating an interactive graphic user interface for enabling a user to control a DVD player to retrieve a multimedia data stream from a DVD and display the multimedia data on a display, the method comprising the steps of:

(a) parsing the multimedia data stream to extract navigation commands therefrom;

(b) providing a database of graphic images, each of which contains graphic data for a menu control image;

(c) retrieving selected graphic images from the database in response to the retrieved navigation commands;

(d) displaying the selected graphic images on the display screen to create a graphic user menu; and (e) in response to user selection from the graphic user menu, controlling a DVD player.

7. The method as recited in claim 6 wherein step (c) comprises the step of:

(c1) building a query from the retrieved navigation commands.

8. The method as recited in claim 7 wherein step (c1) comprises the step of:

(c1a) receiving information from the user to build the query.

9. The method as recited in claim 7 wherein step (c1) comprises the step of:

(c1b) rebuilding the query in response to each new retrieved navigation command.

10. The method as recited in claim 9 wherein step (c1b) comprises the step of using the rebuilt query to retrieve additional graphic images from the database and step (d) comprises the step of displaying the additional graphic images so that the display changes dynamically in response to the navigation commands.

11. A computer program product for dynamically generating an interactive graphic user interface for enabling a user to control a DVD player to retrieve a multimedia data stream from a DVD and display the multimedia data on a display, the computer program product comprising a computer usable medium having computer readable program code thereon, including:

program code for parsing the multimedia data stream to extract navigation commands therefrom;

program code for generating a database of graphic images, each of which contains graphic data for a menu control image;

program code for retrieving selected graphic images from the database in response to the retrieved navigation commands;

program code for displaying the selected graphic images on the display screen to create a graphic user menu; and     program code, responsive to user selection from the graphic user menu, for controlling a DVD player.

12. The computer program product as recited in claim 11 wherein the program code for retrieving selected graphic images comprises:

program code for building a query from the retrieved navigation commands.

13. The computer program product as recited in claim 12 wherein the program code for building the query comprises:

program code for receiving information from the user to build the query.

14. The computer program product as recited in claim 12 wherein the program code for building thequery comprises:

program code for rebuilding the query in response to each new retrieved navigation command.

15. The computer program product as recited in claim 14 wherein the program code for rebuilding the query comprises:

program code for using the rebuilt query to retrieve additional graphic images from the database; and     the program code for displaying the selected graphic images comprises:

program code for displaying the additional graphic images so that the display changes dynamically in response to the navigation commands.

16. Apparatus for dynamically generating an interactive graphic user interface for enabling a user to control a DVD player to retrieve a multimedia data stream from a DVD and display the multimedia data on a display, the apparatus comprising:

a parser responsive to the multimedia data stream for extracting navigation commands therefrom;

a relational database of bitmap images, each of which contains graphic data for a menu control image;

a database mechanism for building a relational database query from the retrieved navigation commands means responsive to the relational database query for retrieving selected bitmap images from the database;

means for displaying the selected bitmap images on the display screen to create a graphic user menu; and     means, responsive to user selection from the graphic user menu, for controlling a DVD player.

17. The apparatus as recited in claim 16 wherein the database is an object-oriented database.

18. The apparatus as recited in claim 17 wherein the database mechanism receives information from the user to build the relational database query.

19. The apparatus as recited in claim 18 wherein the database mechanism constructs a menu type object to generate the query.

20. The apparatus as recited in claim 19 wherein the retrieving means uses the menu type object to retrieve the bitmap images.

21. The apparatus as recited in claim 20 wherein the bitmap images are contained in objects.

* * * * *